2,744,881

VINYL HALIDE RESIN STABILIZED WITH BASIC LEAD DICARBOXYLATES

John G. Hendricks, Chatham, N. J., and Leonard M. Kebrich, Brooklyn, N. Y., assignors to National Lead Company, New York, N. Y., a corporation of New Jersey No Drawing. Application February 27, 1953, Serial No. 339,442

7 Claims. (Cl. 260—45.75)

This invention relates to vinyl resin compositions and more particularly to such compositions stabilized as to their physical properties against the action of light and heat. This application is a continuation-in-part of our co-pending application for "Basic Lead Salts of Organic Acids" Serial No. 107,644 filed on July 29, 1949, now abandoned.

It is well known that vinyl resin compositions are sensitive to the action of light and heat and that the acidic degradation products formed by such action react to affect deterioration of color and other properties. Exposure of vinyl resins to heat particularly, often occurs during the compounding and processing of compositions containing them. Therefore, to stabilize such compositions against this action, so-called heat and light stabilizers have been proposed by the prior art. These stabilizers have included a great variety of metal salts, of both the organic and inorganic classes. Among these, the lead inorganic and organic salts have been widely employed as stabilizers for vinyl compositions. These lead stabilizers, however, have not been entirely satisfactory with regard to the heat stability of the vinyl compositions or in regard to the initial color and off-colors they impart to the plastic compositions.

It is therefore, the object of this invention to provide an improved vinyl resin composition stable against the action of light and heat. This and other objects of the invention will be apparent from the following description thereof.

This invention in its broadest aspects contemplates the provision of a vinyl resin composition which includes as a stabilizing agent from 0.25 to 10% by weight of said resin of a basic lead aliphatic dicarboxylate compound. The basic lead dicarboxylate compound may be introduced into the composition at any desired stage of the manufacture preferably and advantageously before or during the milling or mixing of the ingredients. It has been found that the basic lead aliphatic dicarboxylate compounds disperse readily in the mixture of vinyl resin and other compounding agents so that a uniform dispersion is obtained.

By the term "vinyl halide resin" we mean to include the various vinyl resin compounds and combinations normally considered to be included within this term. These will include polyvinyl halide such as, for instance, polyvinyl chloride; vinyl resins produced by conjointly polymerizing a vinyl halide with, for instance, vinyl acetate or other vinyl ester; vinyl resins produced by conjoint polymerization with an acrylic compound, as for instance, ethyl methacrylate or methyl methacrylate; and co-polymers of a vinyl halide with other vinyl halide resin copolymers, as for instance, vinylidene halide. Therefore, the term vinyl halide resin as herein employed will include any of the above types of vinyl resins and mixtures and combinations of these.

Among the basic lead aliphatic dicarboxylates suitable for use as stabilizing agents are the monobasic and tetrabasic lead fumarates, corresponding to the formula $C_2H_2(COO)_2Pb \cdot XPbO$, where X denotes the number of lead oxide units within the compound (respectively 1 and 4 for monobasic and tetrabasic lead fumarate). In the following formulas X may indicate the fraction one-half and any whole number from one to four. Other basic lead dicarboxylates useful as stabilizers include hemibasic, monobasic and tribasic lead meleate, $C_2H_2(COO)_2Pb \cdot XPbO$; dibasic and tribasic lead malonate, $CH_2(COO)_2Pb \cdot XPbO$; monobasic, dibasic and tribasic lead succinate, $C_2H_4(COO)_2Pb \cdot XPbO$; dibasic lead adipate, $C_4H_8(COO)_2Pb \cdot 2PbO$; dibasic lead azelate, $C_7H_{14}(COO)_2Pb \cdot 2PbO$; dibasic lead sebacate, $$C_8H_{16}(COO)_2Pb \cdot 2PbO$$

and dibasic lead oxalate $(COO)_2Pb \cdot 2PbO$. In general, the lead salts useful in this invention include all the basic lead salts of aliphatic dicarboxylic acids having from 2 to 12 carbon atoms. These compounds are employed in amounts of from 0.25 to 10% based on the weight of the vinyl halide resin in the composition which will ordinarily comprise a substantial or preponderant proportion thereof and conventional plasticizers and other addition agents known in the art. Compositions prepared according to this invention will retain a light color after exposure to heat and/or light under conditions which would result in darkening of prior art compositions.

In order to illustrate more particularly the compositions of this invention the following examples are shown:

EXAMPLE I

A base mix composed of 65 parts by weight of dry vinyl resin consisting of vinyl chloride and vinyl acetate conjointly polymerized, to which was added 35 parts of dioctylphthalate plasticizer, was placed on a heated two roll mill and the product processed into sheets 0.70 inch in thickness in a hydraulic press at 300° F for 30 minutes. Alternatively, 3.25 parts by weight of the dry lead salts of this invention were first mixed with the dry resin basic mix before being fluxed with the plasticizer on the heated mill and pressed into sheets. Samples of the sheeting so prepared were then exposed to heat at 300° F. for up to 9 hours and the color changes noted. A comparison of the various compositions prepared as above described, including compositions with the lead salts of this invention, is given in the following table:

Table I

| Stabilizer | Original Color | 1 hr. at 300° F | 9 hrs. at 300° |
|---|---|---|---|
| No stabilizer | Clear | Very Dark Brown | Opaque, Very Dark Brown. |
| 3.25% Dibasic Lead Sebacate. | Opaque Pale Cream. | Opaque Cream | Opaque Cream. |
| 3.25% Dibasic Lead Adipate. | Opaque White | Opaque White | Opaque White. |

The improvement in light stability is shown in the table below. Here the calendered sheets of stabilized resin prepared as in Example I but 15 mls. in thickness were exposed to the radiation of a testing device which included a source of ultraviolet light.

*Table II*

| Stabilizer | Exposure Time | | | |
|---|---|---|---|---|
| | Start | 100 hrs. | 350 hrs. | 500 hrs. |
| No stabilizer | Clear Film | Light Tan Discoloration. | Very brittle, pink discoloration and spots. | Extremely brittle dark red areas and spots. |
| Dibasic Lead Sebacate | Opaque White Film | No noticeable change | No noticeable change | No noticeable change. |
| Monobasic Lead Maleate | ...do | ...do | ...do | Do. |

The following examples further illustrate the substantially improved stabilization of vinyl compositions employing basic lead salts of the instant invention in comparison to prior art lead stabilizers. These examples show the effects of basic lead aliphatic dicarboxylates against the following classes of lead stabilizers: (1) normal lead dicarboxylates; (2) basic lead aliphatic monocarboxylates; (3) basic lead aromatic monocarboxylates, and (4) basic lead aromatic dicarboxylates.

In these examples 100 parts of vinyl chloride-vinyl acetate (95:5) co-polymer were mixed with 3 parts of the lead stabilizer. 50 parts of dioctylphthalate plasticizer were added to the mix. Mixing and fluxing was carried out on a heated (250° F.) two roll mill of the conventional type. The plastic composition was processed into sheets of 0.70 inch in thickness in a hydraulic press at 300° F. for 30 minutes. This procedure was repeated in all cases except for the employment of various stabilizers as indicated.

Comparative tests of the heat stability of the above vinyl plastic compositions were made by exposing the samples to the effect of 300° F. temperature from 2 to 8 hours in an air oven. The results of these heat exposure tests are given below, wherein changes in color are indicative of degradation.

*Table III.—Basic lead aliphatic dicarboxylates versus normal lead aliphatic dicarboxylates*

| Lead Salt | Color of Plastic vs. Hrs. Exposed to 300°F. | | | | |
|---|---|---|---|---|---|
| | Initial | 2 hrs. | 4 hrs. | 6 hrs. | 8 hrs. |
| Normal Lead Dicarboxylates: | | | | | |
| Lead Oxalate | Tan | Dark Tan | Dark Tan | Brown | Brown. |
| Lead Maleate | Lt. Buff | Buff | Buff | Lt. Tan | Tan. |
| Basic Lead Dicarboxylates: | | | | | |
| Dibasic Lead Oxalate | Lt. Ivory | Lt. Ivory | Lt. Ivory | Lt. Ivory | Lt. Ivory. |
| Monobasic Lead Maleate | Lt. Cream | White | White | White | Lt. Cream. |
| Tribasic Lead Maleate | ...do | Cream | Cream | Cream | Cream. |

*Table IV.—Basic lead aliphatic dicarboxylates versus basic lead aliphatic monocarboxylates*

| Lead Salt | Color of Plastic vs. Hrs. Exposed to 300° F. | | | | |
|---|---|---|---|---|---|
| | Initial | 2 hrs. | 4 hrs. | 6 hrs. | 8 hrs. |
| Basic Lead Monocarboxylates: | | | | | |
| Dibasic Lead Propionate | Lt. Cream | Off White with Purple Cast. | Off White with Purple Cast. | Off White with Purple Cast. | Dark Off White with Purple Cast. |
| Monobasic Lead 2-Ethyl Hexoate. | Lt. Yellow | Lt. Sand | Lt. Sand | Sand | Sand. |
| Monobasic Lead 3,5,5, Trimethyl Hexoate. | ...do | Off White | Off White | Lt. Sand | Lt. Tan. |
| Basic Lead Dicarboxylates: | | | | | |
| Dibasic Lead Malonate | White | White | Lt. Cream | Lt. Cream | Lt. Cream. |
| Tribasic Lead Succinate | ...do | ...do | White | White | White. |

*Table V.—Basic lead aliphatic dicarboxylates versus basic lead aromatic monocarboxylates*

| Lead Salt | Color of Plastic vs. Hrs. Exposed to 300° F. | | | | |
|---|---|---|---|---|---|
| | Initial | 2 hrs. | 4 hrs. | 6 hrs. | 8 hrs. |
| Basic Lead Aromatic Monocarboxylate: Monobasic Lead Benzoate. | White | Lt. Tan | Lt. Tan | Lt. Tan | Dk. Sand. |
| Basic Lead Aliphatic Dicarboxylates: | | | | | |
| Monobasic Lead Adipate | Ivory | Ivory | Ivory | Ivory | Ivory. |
| Monobasic Lead Azelate | ...do | ...do | ...do | ...do | Do. |

The following examples were prepared as above except that 50 parts of butyl benzyl phthalate plasticizer was employed in place of the dioctylphthalate.

*Table VI.—Basic lead aliphatic dicarboxylates versus basic lead aromatic dicarboxylates*

| Lead Salt | Color of Plastic vs. Hrs. Exposed to 300° F. | | | | |
|---|---|---|---|---|---|
| | Initial | 2 hrs. | 4 hrs. | 6 hrs. | 8 hrs. |
| Basic Lead Aromatic Dicarboxylate: | | | | | |
| Dibasic Lead Phthalate | Lt. Tan | Lt. Tan | Tan | Tan | Tan. |
| Basic Lead Aliphatic Dicarboxylate: | | | | | |
| Monobasic Lead Maleate | White | White | Lt. Cream | Lt. Cream | Lt. Cream. |
| Tribasic Lead Succinate | ...do | ...do | ...do | ...do | Do. |

The foregoing examples of the compositions of the instant invention clearly demonstrate their improved initial color and substantially improved stabilization against the effects of heat and light under extremely severe conditions. It will be understood that a variety of plasticizers, coloring and modifying agents may be present without significantly affecting the stabilization thereof. Furthermore, the stabilized compositions may contain other stabilizing agents.

While this invention has been described and illustrated by the examples shown, it is not intended to be strictly limited thereto and other modifications may be employed within the limits of the following claims.

We claim:

1. A composition comprising a vinyl chloride resin and from 0.25 to 10% based on the weight of said resin of a heat and light stabilizer comprising basic lead aliphatic dicarboxylates.

2. A composition comprising a vinyl chloride resin and from 0.25 to 10% based on the weight of said resin of a heat and light stabilizer comprising basic lead aliphatic dicarboxylates having 2 to 12 carbon atoms.

3. A composition comprising a vinyl chloride resin and from 0.25 to 10% based on the weight of said resin of a heat and light stabilizer selected from the class consisting of basic lead salts of oxalic, fumaric, maleic, malonic, succinnic, adipic, azelic and sebacic acid.

4. A composition according to claim 1 in which the stabilizer is tribasic lead maleate, $C_2H_2(COO)_2Pb \cdot 3PbO$.

5. A composition according to claim 1 in which the stabilizer is dibasic lead adipate, $C_4H_8(COO)_2Pb \cdot 2PbO$.

6. A composition according to claim 1 in which the stabilizer is dibasic lead azelate, $C_7H_{14}(COO)_2Pb \cdot 2PbO$.

7. A composition according to claim 1 in which the stabilizer is dibasic lead sebacate, $C_8H_{16}(COO)_2Pb \cdot 2PbO$.

References Cited in the file of this patent

UNITED STATES PATENTS 2,542,179    Buchanan  --------------  Feb. 20, 1951

FOREIGN PATENTS 599,429    Great Britain  ----------  Mar. 12, 1948